United States Patent [19]

Stevenson et al.

[11] 4,098,847
[45] Jul. 4, 1978

[54] PROCESS FOR MAKING HIGH IMPACT POLYMERS FROM DIENE POLYMER AND VINYL AROMATICS

[75] Inventors: John L. Stevenson; Robert A. Fuller, both of Big Spring, Tex.

[73] Assignee: Cosden Technology, Inc., Big Spring, Tex.

[21] Appl. No.: 693,623

[22] Filed: Jun. 7, 1976

Related U.S. Application Data

[63] Continuation-in-part of Ser. No. 449,689, Mar. 11, 1974, abandoned, which is a continuation of Ser. No. 206,134, Dec. 8, 1971, abandoned.

[51] Int. Cl.² ............................................. C08F 279/02
[52] U.S. Cl. .................................. 260/880 R; 526/79; 526/81
[58] Field of Search ................................. 260/880 R

[56] References Cited
U.S. PATENT DOCUMENTS

| 3,047,534 | 7/1962 | Dyer | 260/879 X |
| 3,428,712 | 2/1969 | Carrock | 260/880 R |
| 3,660,534 | 5/1972 | Carrock | 260/880 R |
| 3,781,383 | 12/1973 | Finestone | 260/876 |

Primary Examiner—Christopher A. Henderson

[57] ABSTRACT

A process for the preparation of high gloss, high impact vinyl aromatic hydrocarbons which process comprises (1) subjecting a solution of rubber and vinyl aromatic hydrocarbon monomer to mass polymerization conditions in the presence of a chain transfer agent for a period of 4 to 10 hours until the reaction mass reaches a viscosity of 1800 to 2000 cps., said chain transfer agent being introduced into the reaction mass in two portions, a first portion representing 50 to 90% of the total chain transfer agent to be present during the mass polymerization and being added to said solution at or before the beginning of said mass polymerization and a second portion representing 10 to 50% being added just prior to the end of said mass polymerization, (2) subjecting said reaction mass to suspension polymerization conditions and (3) recovering high impact polymeric vinyl aromatic hydrocarbons having improved high gloss characteristics.

13 Claims, No Drawings

PROCESS FOR MAKING HIGH IMPACT POLYMERS FROM DIENE POLYMER AND VINYL AROMATICS

CROSS-REFERENCE TO RELATED APPLICATIONS

This is a continuation-in-part application of application Ser. No. 449,689, filed Mar. 11, 1974, now abandoned which, in turn, was a continuation of application Ser. No. 206,134 filed Dec. 8, 1971, now abandoned.

BACKGROUND OF THE INVENTION

The present invention relates to the preparation of high impact polymers from vinyl aromatic compounds. More particularly, the present invention relates to the polymerization of vinyl aromatic hydrocarbons in the presence of a rubber whereby a high gloss, high impact vinyl aromatic polymer is obtained.

For many applications of vinyl aromatic polymers, it is highly desirable to have a high surface gloss on the finished product. In many instances, the conventional vinyl aromatic hydrocarbon homopolymers and high impact vinyl aromatic polymers cannot provide the desired gloss. When such occurs, it becomes necessary to use some other type of polymer such as ABS or SAN in place of the much less expensive general purpose and high impact polymeric vinyl aromatics. Therefore, it is desirable to have means for obtaining high gloss in the more usual and less expensive grades of vinyl aromatic polymers. For this reason, there is a continuing search for ways to improve the gloss in the general purpose and high impact vinyl aromatic polymers, without consequent loss of other desirable characteristics of processing properties.

In the polymerization of vinyl aromatic hydrocarbons such as styrene in the presence of a rubber to produce high impact polymers, it has been a practice to employ a chain transfer agent to control the molecular weight of the resulting polymer. Among the chain transfer agents employed are certain mercaptans such as tertiary dodecyl mercaptan and the like. The chain transfer agent customarily is added to the rubber-vinyl aromatic hydrocarbon solution at or prior to the beginning of polymerization. However, the prior art techniques of incorporating these chain transfer agents have resulted in an increasing of the rubber particle size which, consequently, yield a polymerized product exhibiting inferior gloss.

The prior art has recognized certain advantages to incremental addition of the chain transfer agent during the polymerization process. This technique provides addition of less than half of the total amount in a first increment followed by addition of the remainder at some further stage of polymerization in one or more further steps. These prior art techniques have typically been predicted upon the percent of conversion as indicative of the proper time for addition of the second increment with little regard for other properties of the reaction mass. While such techniques have been effective in improving melt flow properties, impact strength as well as other processing characteristics have been diminished, if not completely forfeited. Yet other prior art processes make similar incremental additions with no provisions for the absolute time of addition, the time varying depending upon the polymerization process involved. Exemplary of the latter is U.S. Pat. No. 3,428,712.

It is an object of present invention to provide a new and improved process for the preparation of high impact vinyl aromatic polymers whereby polymers of higher gloss are obtained.

Another object of the present invention is to provide a new and improved high gloss, high impact vinyl aromatic polymer.

An additional object of the present invention is to provide a method for imparting high gloss characteristics to high impact vinyl aromatic polymers.

A specific object of the present invention is to provide a new and novel process for preparing a high gloss, high impact polystyrene.

An additional specific object of the present invention is to provide a new high gloss, high impact polystyrene.

It is yet another object of the present invention to provide a method for the preparation of high impact vinyl aromatic polymers of improved gloss without the need to sacrifice melt flow or other processing properties.

Additional objects will become apparent from the following description of the invention herein disclosed.

SUMMARY OF THE INVENTION

The present invention, which fulfills the above and other objects, is a process for the preparation of high gloss, high impact vinyl aromatic hydrocarbons which process comprises (1) subjecting a solution of rubber and vinyl aromatic hydrocarbon monomer to mass polymerization conditions in the presence of a chain transfer agent for a period of 4 to 10 hours until the reaction mass reaches a viscosity of 1800 to 2000 cps., said chain transfer agent being introduced into the reaction mass in two portions, a first portion representing 50 to 90% of the total chain transfer agent to be present during the mass polymerization, being added to said solution at or before the beginning of said mass polymerization and a second portion representing 10 to 50% being added just prior to the end of said mass polymerization, (2) subjecting said reaction mass to suspension polymerization conditions and (3) recovering high impact polymeric vinyl aromatic hydrocarbons having improved high gloss characteristics.

By the process of the present invention, a high impact vinyl aromatic polymer is produced having a substantially higher gloss than conventional similarly prepared polymers. In addition, and particularly important, this high gloss is obtained with no significant change in the other properties of the polymer.

DESCRIPTION OF THE PREFERRED EMBODIMENTS OF THE PRESENT INVENTION

The term vinyl aromatic hydrocarbon, as used in reference to the present invention, includes any of the aromatic hydrocarbons having substituents containing ethylenic unsaturation. Additionally, it includes such aromatic hydrocarbons having non-hydrocarbon sutstituents such as halogen substituents. Included within such hydrocarbons are styrene, divinylbenzene, vinyl toluene, isopropylstyrene, alpha-methylstyrene, nuclear dimethylstyrene, chlorostyrene, vinyl naphthalene, and the like. The present process, however, will find its most useful application in the formation of vinyl aromatic hydrocarbon polymers in which the vinyl aromatic hydrocarbon monomer is alpha-methyl styrene, vinyl toluene and styrene, preferably styrene.

The rubbers which may be used in preparing the high impact vinyl aromatic hydrocarbon polymers of the present invention can be either normal rubbers such as pale crepe, or preferably synthetic rubber, for instance an SBR synthetic rubber, a copolymer of butadiene and styrene which is usually derived from butadiene and styrene in proportions lying between 50:50 and 95:5 by weight and made by an emulsion process. Polybutadiene rubber (100% butadiene), can also be used. Elastomers produced from vinyl aromatic hydrocarbons other than styrene or dienes other than butadiene are also suitable. One of the primary considerations in selecting the rubber is that is be adequately monomer soluble, i.e., the rubber used should be substantially gel-free so as to dissolve readily in the vinyl aromatic hydrocarbon monomer.

The amount of rubber used in preparing the polymers of the present invention generally is between about 2 and 15% by weight of the vinyl aromatic hydrocarbon monomer. The optimum amount of rubber will depend on the type of rubber used and on the properties required in the final high impact polymer. Preferably, the amount of rubber employed will be within the range of 2 to 10% by weight of the vinyl aromatic hydrocarbon monomer.

To carry out the present invention, the desired amount of rubber is dissolved in the vinyl aromatic monomer. The resulting solution is then subjected to mass polymerization. Mass polymerization may be carried out with or without the use of a catalyst. If carried out under thermal conditions without a catalyst, the mass polymerization step generally employs temperatures within the range of 100° to 125° C., preferably 110° to 115° C. The reaction mass is agitated during this mass polymerization step.

If catalysts are used in carrying out the mass polymerization step of the process of the present invention, the catalyst will usually be one soluble in the vinyl aromatic monomer and one which will generate free radicals. Typical such catalysts are the peroxy and azo catalysts such as benzoyl peroxide, di-t-butyl-peroxide, dicumyl peroxide, t-butyl peracetate, t-butyl perbenzoate, azoisobutyronitrile, and the like. Preferred among these catalysts are such compounds as the dicumyl peroxide, the t-butyl perbenzoate, di-t-butyl-peroxide and t-butyl peracetate.

In employing catalysts in the first stage mass polymerization, sufficient catalyst may be added to carry through both the mass polymerization step and the second step suspension polymerization step. In such instance, the catalyst added may comprise only one of the above mentioned catalysts or it may contain two or more different such catalysts such as, for example, a mixture of t-butyl perbenzoate and dicumyl peroxide. Temperatures employed for the mass polymerization with a catalyst generally will be within the range of 95° to 110° C., preferably 98° to 105° C., with continuing agitation throughout the mass polymerization.

To control the molecular weight of the polymer being produced, a chain transfer agent is employed in accordance with the present invention. The usual chain transfer agents include organic halides, hydroxy compounds, amines, mercaptans, and the like. For the practice of the present invention, the most useful chain transfer agents are the mercaptans, particularly tertiary dodecyl mercaptan. The total amount of chain transfer agent employed generally will be within the range of 0.06 to 0.4% by weight of the initial vinyl aromatic monomer-rubber solution.

As noted above, the prior art is cognizant of various multi-step, incremental additions of chain transfer agents during polymerization of the reaction mass. As also noted, the times of these additions are bottomed upon percent conversion of the reaction mass with little regard to other physical properties thereof, and result in various debilitating consequences on the final properties of the polymerized mass. Surprisingly, it has been determined that decremental additions of the chain transfer agents, as opposed to incremental, at a specific point in time predicated upon a range of reaction mass viscosities, results in polymerized product which exhibits improved gloss and processing properties while retaining intact impact and melt flow characteristics. These surprising and unexpected results can be attributed, at least in part, to a much narrower distribution of molecular weight of the polymer as the consequence of this carefully controlled addition of chain transfer agent.

In accordance with the present invention, an amount of chain transfer agent is added to the solution of rubber and vinyl aromatic monomer at or prior to the beginning of the mass polymerization step. This amount usually will comprise 50 to 90%, preferably at least 55 − 80%, and most preferably 60 − 70%, of the above defined total amount of chain transfer agent to be employed. An additional amount of chain transfer agent is then added just prior to the completion of the mass polymerization step, i.e., within 5 to 20 minutes, preferably 5 to 10 minutes, of the end of the mass polymerization step. The time of this addition may vary provided, however, the reaction mass exhibits a viscosity within the range of from 1800 to 2000 cps. Typically, the reaction mass will exhibit such a viscosity value within the time frame set forth above; however, the absolute time of addition is subject to permissible variation in order to insure the addition occurs within the specific viscosity range of from 1800 to 2000 cps. This additional amount generally will be 10 to 50%, preferably 20 to 45, and most preferably 30 − 40%, of the above defined total amount to be added to the mass polymerization step.

In the practice of the present invention, the mass polymerization generally is carried to about 20 to 50%, preferably 30 to 40%, of complete polymerization. The exact percentage of polymerization completion is not of importance and will vary with different monomer systems. Of more importance is the fact that the second increment of chain transfer agent be added when the reaction mass has attained a viscosity of 1800 to 2000 cps., it being essential that subsequent addition of the chain transfer agent be made within this range. Utilizing the conditions herein set forth for the mass polymerization step, this step of the present invention generally is complete within 4 to 10 hours, more often 4 to 8 hours.

Upon completion of the mass polymerization step in accordance with the process of the present invention, the partially polymerized mass is then subjected to suspension polymerization to complete the formation of the polymer. This suspension polymerization is carried out in the presence of a suspending agent or combination of suspending agents. Among the suspending agents which may be utilized are the water soluble high molecular weight organic polymers such as polyvinyl-alcohol and polyvinyl-pyrrolidone, and the water insoluble organic or inorganic metal salts such as calcium phosphates, magnesium phosphates, magnesium hydroxide, zinc oxide, barium sulphate, calcium oxalate, and calcium citrate. Particularly useful for the process of the present invention are trimagnesium phosphate, tricalcium phosphate, tristrontium phosphate, tribarium phosphate, aluminum phosphate, barium sulphate, lecithin, and the like. In the preferred embodiment of the present invention, the suspending agent is trimagnesium phosphate or tricalcium phosphate formed in situ from trisodium phosphate and magnesium carbonate or calcium chloride, as the case may be. The amount of stabilizing agent used will range from about 0.1 to 0.4% by weight, preferably 0.1 to 0.2% by weight.

In carrying out the process of the present invention employing the water insoluble organic or inorganic metal salts as suspending agents, it is desirable to also include a surfactant. Such surfactant generally is an anionic surface active agent. Among such surface active agents are sodium caproate and sodium oleate; organic sulphates and sulphonates such as long chain alkyl sulphates and sulphonates; sodium salts of alkyl phosphates; the reaction product of tertiary butyl hydroperoxide and sodium formaldehyde sulphoxylate; and other like materials. For the purposes of the present invention, the long chain alkyl sulphates and sulphonates are the preferred surface active agents. Particularly useful are such compounds as sodium dodecylbenzene sulfonate or sodium dodecylsulfate. The amount of surface active agent employed will generally be within the range of 0.02 to 0.2% by weight, preferably 0.06 to 0.2% by weight.

As indicated above, the suspension polymerization step is carried out in the presence of a catalyst. Catalysts useful for such suspension polymerization generally are the same as those discussed above in relation to mass polymerization. For the suspension polymerization step of the present invention, the preferred catalysts are t-butyl perbenzoate, dicumyl peroxide, di-t-butyl peroxide, t-butyl peracetate, or a combination of these. The catalyst may be added during the suspension polymerization step or may be initially added prior to the beginning of the mass polymerization step as mentioned above. The amount of catalyst employed generally will range from about 0.005 to 0.15% by weight of the polymer mass being further polymerized in the suspension polymerization step to produce the final vinyl aromatic polymer.

The suspension polymerization step is carried out at a temperature within the range of 88° to 135° C., preferably within the range of 105° to 135° C.

Upon completion of the suspension polymerization which generally is completed within 6 to 12 hours, the resulting polymers are separated, treated with dilute acids, washed and dried.

In order to further describe and to illustrate the present invention, the following non-limiting examples are presented.

EXAMPLE 1

Approximately 18 pounds of sterospecific polybutadiene rubber obtained from Firestone Tire and Rubber Company were dissolved in 39.6 gallons (300 lbs.) of styrene monomer. To this solution was added about 68.1 grams of tertiary dodecyl mercaptan. The solution was then heated while being agitated to a temperature of approximately 110° C. and maintained at this temperature for a period of approximately 6 hours until the viscosity of the solution reached 2,000 centapoise. The reaction mass was continuously agitated throughout this period. Approximately 10 minutes prior to the end of the above 8 hours period, an additional 40.9 grams of tertiary dodecyl mercaptan were introduced into the reaction mass.

To the reaction mass produced as described above, was added with continuous agitation of the reaction mass, lubricant, t-butyl perbenzoate, suspending agent, surfactant and the reaction mass brought to suspension. The reaction mass was maintained at a temperature of 115° C. for about 4 and one quarter hours. The temperature was then raised to approximately 129° C. and maintained at such temperature for about 2 hours. The reaction mass was then cooled, treated with dilute acids and then washed and dried.

A sample of the polymer produced was tested for gloss by means of ASTM D 523-67 using a Gardner portable glossometer. The gloss was determined as percent reflectance and had a value of 92.

EXAMPLE 2

Example 1 was substantially repeated with the exception that 76.6 grams of tertiary dodecyl mercaptan were initially added instead of 68.1 grams as in Example 1 and 25.5 grams of the mercaptan were added 10 minutes prior to the end of the mass polymerization step instead of the 34 grams of Example 1. Upon determination of the gloss of the polymer produced, it was found to have a value of 90.

EXAMPLE 3

Example 1 was again substantially repeated with the exception that 102.1 grams of tertiary dodecyl mercaptan was initially added instead of the 68.1 grams of Example 1 and no dodecyl mercaptan was added at any time after the beginning of the mass polymerization step. Upon testing for gloss, the polymers so produced were found to have a value of 72.

From consideration of Examples 1, 2 and 3 above, the advantage of employing the process of the present invention is apparent. By adding a portion of the chain transfer agent prior to beginning mass polymerization and the remaining portion, within the limits defined herein, just prior to the end of mass polymerization, the gloss of the resulting high impact polymer is substantially improved.

While the invention has now been described in terms of various preferred embodiments and illustrated by way of examples, it will be appreciated that yet other modifications, substitutions, omissions and changes may be made without departing from the spirit thereof. It is intended, therefore, that the invention be limited only by the scope of the following claims.

What is claimed is:

1. In a process for the preparation of a rubber-modified, high impact vinyl aromatic hydrocarbon polymer which comprises subjecting a solution of rubber and a vinyl aromatic hydrocarbon monomer to mass polymerization conditions in the presence of from about 0.06 to 0.4% by weight based on the initial vinyl aromatic monomer-rubber solution of a mercaptan chain transfer agent for a period of from about 4 to 10 hours until from about 20 to 50% of the reaction mixture has been polymerized, suspending the resulting reaction mixture in an aqueous suspension containing a suspending agent, a surface active agent and a peroxy free radical initiating catalyst and thereafter polymerizing the resulting suspension to obtain substantially complete conversion of the vinyl aromatic monomers to polymer material, the improvement which comprises decrementally adding said mercaptan chain transfer agent to said mass polymerization solution in first and second portions, said first portion representing from at least 55 to 80% of the total chain transfer agent and being added to the mass polymerization reaction solution at or before the beginning of said mass polymerization step, said second portion of said mercaptan chain transfer agent representing from about 20 to 45% of the total chain transfer agent and being added to the mass polymerization reaction solution at a point in time at which said reaction mass reaches a viscosity of from about 1800 to 2000 cps., and recovering from the suspension polymerization step a rubber-modified vinyl aromatic polymer having a substantially higher gloss together with impact and melt flow properties maintained at desirably high levels.

2. The process as defined by claim 1, wherein said rubber is a polybutadiene rubber.

3. The process as defined by claim 1, wherein said first portion of the mercaptan chain transfer agent represents about 60 to 70% of the total chain transfer agent and said second portion of the mercaptan chain transfer agent represents about 30 to 40% of the total chain transfer agent.

4. The process as defined by claim 1, wherein said second portion of the mercaptan chain transfer agent is added at a point in time between about 5 and 20 minutes prior to completion of the mass polymerization step.

5. The process as defined by claim 1, wherein said chain transfer agent is tertiary dodecyl mercaptan.

6. The process as defined by claim 1, wherein the vinyl aromatic hydrocarbon monomer is one selected from the group consisting of styrene, alpha-methyl styrene and vinyl toluene.

7. The process as defined by claim 1, wherein the amount of rubber is within the range of from about 2 to 10% by weight of the vinyl aromatic hydrocarbon monomer.

8. The process as defined by claim 6, wherein the vinyl aromatic hydrocarbon monomer is styrene.

9. The process as defined by claim 1, wherein no catalyst is employed in said mass polymerization step and said step is carried out at a temperature within the range of from about 100° to 125° C.

10. The process as defined by claim 1, wherein the improvement further consists essentially in employing a non-water soluble suspending agent in said suspension polymerization step.

11. The process as defined by claim 10, wherein said non-water soluble suspending agent is selected from the group consisting of tri-magnesium phosphate and tri-calcium phosphate.

12. The process as defined by claim 1, wherein said non-water soluble suspending agent is formed in situ from tri-sodium phosphate and a compound selected from magnesium carbonate and calcium chloride.

13. The process as defined by claim 1, wherein said surface active agent is selected from the group consisting of sodium dodecyl benzene sulphonates and sodium dodecyl sulphates and said peroxy free radical initiating catalyst is tertiary-butyl perbenzoate or dicumyl peroxide.

* * * * *